United States Patent [19]

Ida

[11] Patent Number: 4,471,078

[45] Date of Patent: Sep. 11, 1984

[54] PROCESS FOR PREPARATION OF SELECTIVE LIGHT ABSORPTIVE METHACRYLIC RESINS

[75] Inventor: Kozo Ida, Otake, Japan

[73] Assignee: Mitsubishi Rayon Company, Ltd., Tokyo, Japan

[21] Appl. No.: 504,162

[22] Filed: Jun. 14, 1983

[30] Foreign Application Priority Data

Jun. 21, 1982 [JP] Japan ............................... 57-106603
Jun. 24, 1982 [JP] Japan ............................... 57-109039

[51] Int. Cl.$^3$ .................... C08K 3/22; C08K 3/24; C08K 5/09; C08L 33/12
[52] U.S. Cl. ................................ 523/137; 523/106; 524/714; 524/730; 524/745; 524/779; 524/780; 524/786; 524/788; 524/853
[58] Field of Search ............... 523/137, 106; 524/714, 524/730, 779, 853, 780

[56] References Cited

U.S. PATENT DOCUMENTS

| | | | |
|---|---|---|---|
| 2,241,415 | 5/1941 | Moulton | 523/106 |
| 3,692,688 | 9/1972 | Castellion et al. | 524/853 |
| 3,726,586 | 4/1973 | Smialkowski et al. | 524/730 |
| 4,231,905 | 11/1980 | Neefe | 523/106 |
| 4,269,760 | 5/1981 | Wakimoto et al. | 524/853 |
| 4,304,895 | 12/1981 | Loshaek | 523/106 |

FOREIGN PATENT DOCUMENTS

| | | | |
|---|---|---|---|
| 44-4230 | 2/1969 | Japan | 524/853 |
| 57-74301 | 5/1982 | Japan | 524/779 |
| 907039 | 2/1982 | U.S.S.R. | 524/853 |

*Primary Examiner*—Ronald W. Griffin
*Attorney, Agent, or Firm*—Oblon, Fisher, Spivak, McClelland & Maier

[57] ABSTRACT

A methacrylic resin capable of selectively absorbing light rays having a wavelength of 580 nm is advantageously produced either by dispersing or dissolving neodymium compound in a resin-forming starting material selected from monomeric methyl methacrylate, a monomer mixture composed mainly of methyl methacrylate and partially polymerized products thereof, and polymerizing the resin-forming starting material. A solvent capable of dissolving therein the resin-forming starting material and the neodymium compound may be incorporated in the resin-forming starting material.

18 Claims, 3 Drawing Figures

PROCESS FOR PREPARATION OF SELECTIVE LIGHT ABSORPTIVE METHACRYLIC RESINS

BACKGROUND OF THE INVENTION (1) Field of the Invention

This invention relates to a process for the preparation of selective light absorptive methacrylic resins. More particularly, it relates to a process for the preparation of methacrylic resins capable of selectively absorbing light rays having a wavelength of about 580 nm.

(2) Description of the Prior Art

Since methacrylic resins have an excellent transparency and a high strength, they are widely used in various fields, for example, as illuminators, signboards, glazings, filters and the like.

A demand for comfortable illumination has been increased with elevation of the living level and therefore, it is desired to improve the rendition in relation to color in a high-brightness lamp and prevent the glare in the field of illumination.

Furthermore, with recent development of office computers and word processors comprising a cathode ray tube (hereinafter referred to as "CRT" for brevity), the problem of the fatigue of operator's eyes by high-brightness letters or figures on the CRT in case of the long-time use of these instruments becomes serious.

It is known that the foregoing problems can be solved if a light source is viewed through a cover or filter capable of selectively absorbing light rays having wavelengths of about 580 nm which exhibit a highest visibility to men. As a material to be used for attaining this purpose, a glare-preventive glass comprising an inorganic glass coated with neodymium oxide having a high absorption to rays having wavelengths of about 580 nm is known (see Japanese Unexamined patent Publication No. 51-99544). Since this glare-preventive glass is formed by coating neodymium oxide on the surface of an inorganic glass, it is difficult to manufacture a glare-preventive glass article of an optional desired shape. Furthermore, the glare-preventive glass is heavy and easily borken while it is used. Glare-preventive filters comprising plastics instead of inorganic glass have also been investigated and proposed. For example, Japanese Examined patent Publication No. 40-3150 proposes a process in which a methacrylic resin is dipped in an aqueous potassium hydroxide solution in methanol and the resin is then dipped in an aqueous neodymium salt solution in methanol to form a coating on the surface of the resin. In this process, however, the coating effect is insufficient and the neodymium salt is readily separated. Japanese Examined patent Publication No. 42-3949 proposes a process in which a partially polymerized liquid of a starting methacrylic monomer material is cast in a mold the molding surface of which has been coated with an organic film of a water-soluble polyether polymer containing a neodymium salt, and the polymerization is effected in the casting mold. This process, however, has a problem such that incorporation of the neodymium salt into the resin is difficult and the preparation steps are complicated and costly. Moreover, Japanese Examined patent Publication No. 44-5091 proposes a process in which methyl methacrylate is incorporated with a neodymium solution in anhydrous stannic chloride solvent and the resulting solution is subjected to the cast polymerization. However, since anhydrous stannic chloride fumes in air to form hydrogen chloride gas, handling is difficult and a methacrylic resin sheet obtained by the polymerization tends to be readily yellowed. Still further, Japanese Examined patent Publication No. 57-59263 proposes a plastic composition comprising a plastic material and a neodymium compound incorporated therein. According to this proposal, the neodymium compound is blended with the plastic material obtained by the polymerization, or the plastic material obtained by the polymerization is dissolved in a solvent and the solution is mixed with the neodymium compound. However, the plastic material in the composition must have a relatively low degree of polymerization so that it can be subjected to molding or extrusion. Therefore, the shaped articles made therefrom have poor mechanical strength and solvent resistance.

SUMMARY OF THE INVENTION

It is a primary object of the present invention to provide a process for preparing a methacrylic resin capable of selectively absorbing light rays having a wavelength of 580 nm, whereby the methacrylic resin having no defects which are observed in the heretofore proposed selective light absorptive methacrylic resins can be advantageously produced.

More specifically, in accordance with the present invention, there is provided a process for the preparation of selective light absorptive methacrylic resins, which comprises dispersing or dissolving a neodymium compound in a resin forming starting material selected from monomeric methyl methacrylate, a monomer mixture composed mainly of methyl methacrylate and a partially polymerized product thereof, followed by polymerizing the resin forming starting material.

DESCRIPTION OF THE PREFERRED EMBODIMENTS

Figure 1:
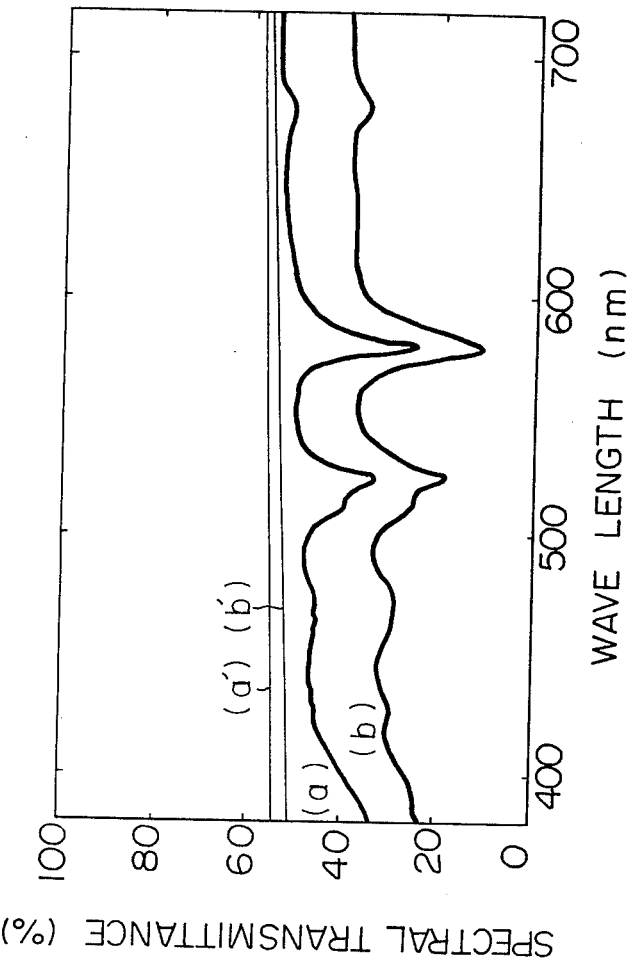
FIG. 1 shows spectral transmittance curves (a) and (b) of methacrylic resins prepared by the process of the present invention and those (a') and (b') of comparative methacrylic resins.

The resinforming starting material used in the present invention is selected from monomeric methyl methacrylate, a monomer mixture composed mainly of methyl methacrylate and partially polymerized products thereof. The monomer mixture composed mainly of methyl methacrylate is a mixture of at least 50% by weight of methyl methacrylate with not more than 50% by weight of other ethylenically unsaturated monomer copolymerizable with methyl methacrylate. As the ethylenically unsaturated monomer copolymerizable with methyl methacrylate, there can be mentioned acrylic acid esters, methacrylic acid esters, styrene, α-methylstyrene and ethylene glycol dimethacrylate as a crosslinking agent, though comonomers that can be used are not limited to exemplified above. The polymer content in the partially polymerized product is not particularly critical so far as the object of the present invention is attained. However, it is ordinarily preferable that the polymer content be up to 50% by weight while the viscosity is in the range of 1 to 5000 cP.

The neodymium compound used in the present invention is not particularly limited, but various neodymium compounds can be used, which include inorganic neodymium compounds, neodymium salts of inorganic acids, neodymium salts of organic acids, complex compounds containing neodymium and neodymium-containing double salts of inorganic and/or organic acids. More specifically, the neodymium compounds used include, for example, neodymium compounds such as neodymium oxide and neodymium hydroxide; neodymium salts of inorganic acids such as neodymium phosphate, neodymium sulfate, neodymium chloride, neodymium nitrate and neodymium carbonate; neodymium salts of organic acids such as neodymium acetate, neodymium n-octylate, neodymium acrylate and neodymium methacrylate; neodymium-containing complex compounds such as trisacetylacetonatoneodymium and trisbenzoylacetonatoneodymium; and neodymium-containing double salts such as neodymium magnesium nitrate and neodymium methacrylate n-octylate.

The above-mentioned neodymium salts can be prepared, for example, by the reaction of neodymium oxide with an inorganic or organic acid and by the reaction of neodymium oxide with acetylacetone or benzoylacetone.

The above-mentioned neodymium compounds may be either dispersed or dissolved in a resin-forming starting material, depending upon the intended use of the resulting methacrylic resin. When the neodymium compounds are dissolved in a resin-forming material, if desired, solvent capable of dissolving both the neodymium compound and the resin-forming material may be used. If it is intended to produce a methacrylic resin sheet exhibiting no light scattering, it is preferable to employ the method wherein the neodymium compound is dissolved in the resin-forming material.

The neodymium compound to be dispersed in the resin-forming material preferably has an average particle size of from 0.2 to 20 $\mu$m.

As the solvent used for dissolving the neodymium compound in the resin-forming starting material, compounds having a dissolving power to both the resin-forming starting material and the neodymium compound can be mentioned. For example, there may be used compounds represented by the following general formulae 1 through 6:

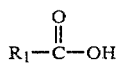     (1)

wherein $R_1$ is a saturated or unsaturated hydrocarbon residue haing 1 to 20 carbon atoms,

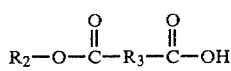     (2)

wherein $R_2$ is a hydrogen atom or a saturated or unsaturated hydrocarbon residue having 1 to 9 carbon atoms and $R_3$ is a saturated or unsaturated hydrocarbon residue having 1 to 4 carbon atoms,

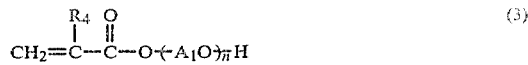     (3)

wherein $R_4$ is a hydrogen atom or a methyl group, $A_1$ is an alkylene group having 2 to 6 carbon atoms and n is 0 or an integer of from 1 to 10,

     (4)

wherein $R_5$ is a hydrogen atom or a methyl group and $R_6$ is an alkylene group having 2 to 6 carbon atoms,

     (5)

wherein $R_7$ is a saturated or unsaturated hydrocarbon residue having 3 to 10 carbon atoms,

     (6)

wherein $R_8$ is a group OH or a saturated or unsaturated hydrocarbon residue having 1 to 10 carbon atoms, $A_2$ is an alkylene group having 2 to 4 carbon atoms and m is an integer of from 2 to 10.

These solvents represented by the general formulae (1) through (8) are common solvents for homogeneously dissolving a neodymium compound in the resin-forming starting material. For example, there can be mentioned unsaturated carboxylic acids such as methacrylic acid and acrylic acid; saturated or unsaturated fatty acids such as propionic acid, isobutyric acid, octylic acid, hexanoic acid, octylbenzoic acid, stearic acid, palmitic acid and naphthenic acid; hydroxyl group-containing esters such as 2-hydroxyethyl acrylate and 2-hydroxyethyl methacrylate; saturated alcohols such as propyl alcohol and cyclohexyl alcohol; unsaturated alcohols such as benzyl alcohol; and glycols such as ethylene glycol, diethylene glycol and propylene glycol. Monomers copolymerizable with methyl methacrylate, such as methacrylic acid, acrylic acid, 2-hydroxyethyl methacrylate and 2-hydroxyethyl acrylate, are more preferable. These solvents may be used alone or in the form of mixtures of two or more of them.

The amount of the neodymium compound used in the present invention is 0.1 to 5.0% by weight expressed in terms of neodymium and based on the weight of the resin-forming starting material. If the amount of neodymium is smaller than 0.1% by weight, the selective light absorptivity of the obtained resin plate is degraded. Even if the amount of neodymium exceeds 5% by weight, the absorption of light rays having a wavelength of about 580 nm increases not to any appreciable extent. Thus, the addition of neodymium exceeding 5% should be avoided from a cost consideration.

The amount of the solvent used in the present invention is varied according to the kind and amount of the neodymium compound used, but the solvent is ordinarily used in an amount of 0.1 to 40% by weight based on the weight of the total composition. If the amount of the solvent is smaller than 0.1% by weight, it is impossible to homogeneously dissolve the neodymium compound in the resin-forming starting material. If the amount of the solvent is larger than 40% by weight, the mechanical and thermal properties of the obtained resin are degraded.

In the present invention, a light diffusing agent can be used in addition to the above-mentioned neodymium compounds. In this case, since a selective absorptivity to transmitted and diffused light rays can be given to the resulting resin plate. Thus, the resin plate exhibits an improved rendition in relation to color and is useful for an illumination cover or a rear-type projection screen. Known light diffusing agents can be used, which include, for example, inorganic fine particles such as those of calcium carbonate, barium sulfate, silica and aluminum hydroxide, and fine plastic resin particles (such as polystyrene particles) having a refractive index different from that of the base resin formed solely from the resin-forming starting material. The amount of the light diffusing agent is preferably not more than 10% by weight based on the weight of the total composition.

When dyes or pigments capable of absorbing light rays having wavelengths of about 500 nm and about 660 nm are used in combination with the neodymium compounds, it becomes possible to obtain a selective light absorptive and diffusing article having a high transmitting property to diffused rays of blue, green and red light sources (having wavelengths of about 450 nm, about 550 nm and about 620 nm, respectively), but a high absorptivity to diffuesed rays having other wavelengths, such as a screen of a transmission type large-sized television set. Moreover, when a lead compound such as lead acrylate or lead methacrylate is used in addition to the neodymium compounds, a radiation-shielding article can be obtained.

If desired, an ultraviolet absorber, an infrared absorber or other selective light absorber having an absorptivity to visible rays can also be used in addition to the above-mentioned neodymium compounds.

Known radical initiators, for example, peroxide type initiators such as benzoyl peroxide and lauroyl peroxide and azo-bis type initiators such as 2,2'-azobisisobutyronitrile, 2,2'-azobis-(2,4-dimethylvaleronitrile) and 2,2'-azobis-(2,4-dimethyl-4-methoxyvaleronitrile), can be used as the polymerization initiator for preparing the intended methacrylic resin. These polymerization initiators may be used alone or in the form of mixtures of two or more of them. The polymerization initiator is used in an amount of 0.001 to 0.1 part by weight per 100 parts by weight of the resin-forming starting material.

The polymerization process per se for obtaining the methacrylic resin of the present invention is not particularly critical, but there may preferably be adopted a cast polymerization process in which the starting material comprising the starting monomer, the neodymium compound, a solvent and optional additives is cast into a casting mold comprising inorganic glass plates, stainless steel plates, nickel-chromium plates or aluminum plates and a gasket composed of non-rigid polyvinyl chloride resin and the polymerization is carried out in this mold. The cast polymerization is preferably carried out in two stages, i.e., at 45° to 95° C. for 0.3 to 15 hours in the first stage and then at 80° to 150° C. for 10 min. to 5 hours in the second stage.

The cast product obtained by the cast polymerization may be used in the form of the as-obtained plate or it may be pulverized and used as a material for production of various molded articles.

The polymerization process per se for the preparation of the selective light absorptive methacrylic resin having the above-mentioned structure may be conventional and similar to the process customarily adopted for ordinary methacrylic resins. The resulting methacrylic resin plate possesses a uniform quality and is free of yellowing and capable of selectively absorbing light rays having a wavelength of about 580 nm. This methacrylic resin plate can be used in various field for example, as a glare-preventive filter, eye glasses, a glare-preventive window pane of an automobile, a ship or other vehicle or a glare-preventive window pane of a building or the like, an NaD ray shielding physicochemical filter, a CRT and a front panel of a display device. Furthermore, when a light diffusing agent is further incorporated, the obtained methacrylic resin plate can be used as a screen plate, an illumination cover for a high-brightness lamp and a radiation shielding material.

The present invention will now be described in detail with reference to the following examples that by no means limit the scope of the invention.

In the examples, the total luminous transmittance, the light diffusion and the spectral transmittance curve were determined according to the following procedures.

(1) The total luminous transmittance (%) was determined according to ASTM D-1003-61.

(2) The light diffusion was expressed by the minimum distance where the shape of a fluorescent lamp became invisible.

(3) The spectral transmittance curve was determined by using a color analyzer (Model 307 supplied by Hitachi Seisakusho).

EXAMPLE 1

To 100 parts by weight of a partially polymerized product of methyl methacrylate (the conversion was 18%) were added 0.04 part by weight of 2,2'-azobis-(2,4-dimethylvaleronitrile) as the polymerization catalyst, 0.005 part by weight of dioctyl sodium sulfosuccinate as a release agent and 1.0 part by weight of neodymium oxide having an average particle size of 4 $\mu$m. The mixture was deaerated and then cast in a casting mold comprising tempered glass sheets and a non-rigid polyvinyl chloride resin gasket, which was arranged so that the thickness of the resulting resin sheet was 2 mm. The casting mold was dipped in warm water maintained at 70° C. for 60 minutes and was then placed in an air bath maintained at 130° C. for 80 minutes to complete the polymerization. The molded sheet removed from the casting mold had a total luminous transmittance of 50%, a light diffusion of 2 cm and a spectral transmittance curve (a) shown in FIG. 1.

EXAMPLE 2

To 100 parts by weight of a partially polymerized product of methyl methacrylate (the conversion was 18%) were added 0.04 part by weight of 2,2'-azobis-(2,4-dimethylvaleronitrile), 0.005 part by weight of dioctyl sodium sulfosuccinate, 1.5 parts by weight of neodymium acetate having an average particle size of 2 $\mu$m and 1.5 parts by weight of calcium carbonate having an average particle size of 1 $\mu$m. The polymerization was carried out under the same conditions according to the same method as described in Example 1 to obtain a molded sheet having a total luminous transmittance of 35%, a light diffusion of 1 cm and a spectral transmission curve (b) shown in FIG. 1.

When the molded sheet was used as a cover for a 300-W metal halide lamp or 250-W mercury lamp as a high-brightness lamp, an excellent glare-preventive effect was observed.

EXAMPLE 3

Figure 2:
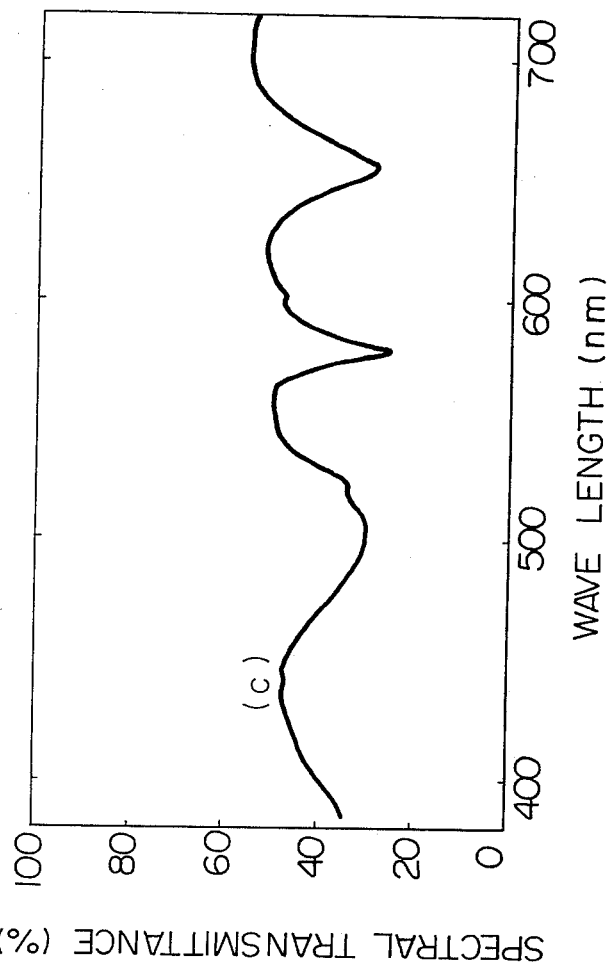
FIG. 2 shows a spectral transmittance curve (c) of another methacrylic resin prepared by the process of the present invention.

To 100 parts by weight of a partially polymerized product of methyl methacrylate (the conversion was 18%) were added 0.04 part by weight of 2,2'-azobis-(2,4-dimethylvaleronitrile), 0.005 part by weight of dioctyl sodium sulfosuccinate, 0.5 part by weight of neodymium oxide having an average particle size of 4 μm, 0.001 part by weight of Aizen Spiron Blue GNH (supplied by Hodogaya Kagaku; C.I. No. 081) and 0.001 part by weight of Diaresin Red S (supplied by Mitsubishi Kasei Kogyo; C.I. No. Solvent Red 152). The polymerization was carried out under the same conditions according to the same method as described in Example 1 to obtain a molded sheet a total luminous transmittance of 45%, a light diffusion of 2 cm and a spectral transmittance curve (c) shown in FIG. 2.

When the sheet was used as a screen for a large-sized television set, the sheet was excellent over the sheets obtained in Comparative Examples 1 and 2, below, in the contrast and color rendition.

COMPARATIVE EXAMPLES 1 and 2

To 100 parts by weight of a partially polymerized product of methyl methacrylate (the conversion was 18%) were added 0.04 part by weight of 2,2'-azobis-(2,4-dimethylvaleronitrile) and 0.05 part by weight of dioctyl sodium sulfosuccinate, and then, 1.5 parts by weight of barium sulfate having an average particle size of 2 μm (Comparative Example 1) or 1.5 parts by weight of calcium carbonate having an average particle size of 0.5 μm (Comparative Example 2) was added to the mixture. The polymerization was carried out under the same conditions according to the same method as described in Example 1 to obtain a molded sheet having a spectral transmittance curve (a') (Comparative Example 1) or (b') (Comparative Example 2) shown in FIG. 1.

As is apparent from FIG. 1, the spectral transmittance curves (a') and (b') of the sheets obtained in Comparative Examples 1 and 2 have substantially constant values in the visible ray region, and the color rendition of these sheets are poor.

COMPARATIVE EXAMPLE 3

To 100 parts by weight of a methacrylic resin (Acrypet VH supplied by Mitsubishi Rayon) was added 1.0 part by weight of neodymium oxide having an average particle size of 4 μm. The mixture was sufficiently blended and homogenized by using a tumbler and was thereafter formed into a sheet having a thickness of 2 mm by using an extruder. The obtained sheet had a total luminous transmittance of 50%, a light diffusion of 2 cm and a spectral transmittance curve (a) shown in FIG. 1.

EXAMPLE 4

Figure 3:
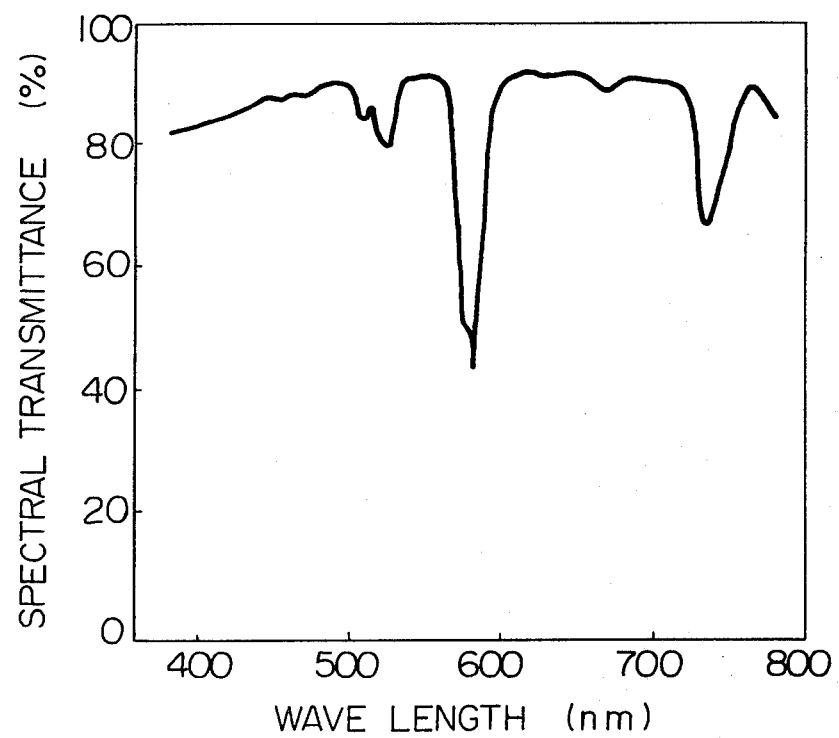
FIG. 3 shows a spectral transmittance curve of still another methacrylic resin prepared by the process of the present invention.

3 g of neodymium nitrate (molecular weight about 330; Nd content=43.6%) was dissolved in a mixture of 17 g of 2-hydroxyethyl methacrylate and 2 g of propylene glycol. The obtained solution was added to 78 g of methyl methacrylate and then the mixture was stirred. The obtained liquid mixture had a light violet color and was transparent. Then, 0.04 g of 2,2'-azobis-(2,4-dimethylvaleronitrile) as the polymerization catalyst and 0.005 g of dioctyl sodium sulfosuccinate as the release agent were dissolved in the liquid mixture. The solution was deaerated and then cast in a customary inorganic tempered glass casting mold which was arranged so that the thickness of the resulting sheet was 3 mm. The casting mold was dipped in warm water maintained at 65° C. for 180 minutes and was placed in an air bath maintained at 110° C. for 120 minutes to complete the polymerization. The resin sheet taken out from the casting mold had a light pink color. When the spectral transmittance of the resin sheet was determined, as shown in FIG. 3, a strong absorption was observed at a wavelength of about 580 nm.

EXAMPLE 5

1.5 g of neodymium nitrate was dissolved in 8.5 g of 2-hydroxyethyl methacrylate. The obtained solution was added to 90 g of a partially polymerized product of methyl methacrylate (the conversion was 4%) and then the mixture was stirred. The obtained liquid mixture had a light violet color and was transparent. The same polymerization catalyst and release agent in the same amounts as described in Example 4 were added to the liquid mixture, and the cast polymerization was carried out under the same conditions as described in Example 4. The resin sheet thus obtained was transparent and had a light pink color.

EXAMPLE 6

1.5 g of neodymium acetate was dissolved in 8.5 g of methacrylic acid. The solution was added to 90 g of methyl methacrylate and then the mixture was stirred. The obtained liquid mixture had a light violet color and was transparent. The same polymerization catalyst and release agent in the same amounts as described in Example 4 were added to the liquid mixture. The cast polymerization was carried out in the same manner as described in Example 4. After completion of the polymerization, the resin sheet was taken out from the casting mold. The resin sheet was transparent and had a light pink color.

EXAMPLE 7

1.5 g of neodymium nitrate was dissolved in 8.5 g of 2-hydroxyethyl acrylate. The solution and 2.0 g of aluminum hydroxide having an average particle size of 4 μm were added to 88 g of a partially polymerized product of methyl methacrylate (the conversion was 20%) and then the mixture was stirred for 30 minutes. The same polymerization catalyst and release agent in the same amounts as described in Example 4 were added to the liquid mixture. The cast polymerization was carried out in the same manner as described in Example 4. The resin sheet removed from the casting mold after completion of the polymerization had a light diffusing property and, when transmitted rays were examined, it was found that the resin sheet had a selective absorptivity.

EXAMPLE 8

To 89.5 g of a partially polymerized product of methyl methacrylate (the conversion was 20%) were added 1.0 g of neodymium nitrate, 6 g of 2-hydroxyethyl methacrylate, 1 g of propylene glycol, 2.5 g of silica having an average particle size of 3 μm, 0.002 g of a blue dye (Seikagen Blue 3400 supplied by Dainichi Seika) and a red dye (Diaresin Red S supplied Mitsubishi Kasei Kogyo). The mixture was sufficiently stirred for 30 minutes. The same polymerization catalyst and parting agent in the same amounts as described in Example 4 were added to the liquid mixture. The cast polymerization was carried out in the same manner as described in Example 4. The resin sheet removed from the casting mold after completion of the polymerization had a light diffusing property. When transmitted rays were examined, absorptions were observed at wavelengths of about 500 nm, about 580 nm and about 670 nm. When a color photographic image was projected by a projector by using the obtained resin sheet as a screen, the projected image could be viewed sharply with a high contrast.

EXAMPLE

To 2.5 of neodymium methacrylate (molecular weight=about 399 and Nd content=36.1%) were added 2.0 g of n-octylic acid and 2.5 g of methyl methacrylate. The mixture was heated at 65° C. for 10 minutes to completely dissolve neodymium methacrylate. The solution was mixed with 93 g of methyl methacrylate. The cast polymerization was carried out in the same manner as described in Example 4. The obtained resin sheet was transparent and had a light pink color.

Tensile strength and solvent resistance of the resin sheets obtained in Examples 1 and 9 and Comparative Example 3 were determined. The results are shown in Table 1.

TABLE 1

|  | Tensile break strength*[1] (kg/cm$^2$) | Resistance to stress break in solvent*[2] (min) |
| --- | --- | --- |
| Example 1 | 750 | 35 |
| Example 9 | 760 | 40 |
| Comparative Example 3 | 700 | 5 |

*[1]Tensile break strength was determined according to ASTM D638
*[2]Resistance to stress break in solvent was determined according to MIL-T-8184B using isopropyl alcohol as solvent and at a stress of 300 kg/cm$^2$, and expressed in the time period when the specimen broke at the cracked portion.

EXAMPLE 10

To a mixture of 80 g of methyl methacrylate and 13 g of styrene were added 2.0 g of neodymium methacrylate, 3.0 g of neodimium n-octylate (having a molecular weight of about 573 and a Nd content of about 25%) and 2.0 g of propylene glycol to obtain a uniform solution. The solution was subjected to cast polymerization by the same procedure as that described in Example 4. The sheet thus obtained was transparent and had a light pink color.

EXAMPLES 11 THROUGH 16

Neodymium methacrylate, n-octylic acid, propylene glycol, 2-hydroxyethyl methacrylate (HEMA) and methyl methacrylate were mixed together in the proportion shown in Table 2. The mixture was maintained at 55° C. for 30 minutes while being stirred, to obtain a uniform solution. The solution was subjected to cast polymerization by the same procedure as that described in Example 4. The sheet thus obtained was transparent. The spectral transmittance of the sheet at the absorption peak observed at a wavelength of about 580 nm is shown in Table 2.

TABLE 2

| Example No. | Nd methacrylate (%) | n-Octylic acid (%) | Propylene glycol (%) | HEMA (%) | MMA (%) | Spectral transmittance (%) |
| --- | --- | --- | --- | --- | --- | --- |
| 11 | 1.1 | 1.0 | 1.0 | — | 96.9 | 68 |
| 12 | 2.5 | 1.5 | 1.0 | — | 95.0 | 52 |
| 13 | 4.0 | 2.0 | 1.0 | — | 93.0 | 35 |
| 14 | 6.0 | 2.5 | 1.0 | — | 90.5 | 22 |
| 15 | 7.7 | 2.5 | 1.0 | 1.0 | 87.8 | 13 |
| 16 | 9.0 | 2.5 | 1.0 | 1.0 | 86.5 | 10 |

EXAMPLE 17

To a mixture of 6.0 g of neodymium methacrylate, 2.0 g of n-octylic acid, 1.0 g of 2-hydroxyethyl acrylate, 20 g of styrene and 39 g of methyl methacrylate were added 14 g of lead methacrylate and 18 g of lead octylate at 75° C. under stirring to obtain a solution. The solution was subjected to cast polymerization by the same procedure as that described in Example 4. The sheet thus obtained was transparent.

The lead content of the sheet (3 mm is thickness) was about 15% by weight. This lead content proved to correspond to a lead layer of 0.24 mm in thickness from the damping factor for gamma rays from Co-60 (150 kV).

EXAMPLE 18

To 93 g of methyl methacrylate were added 5.0 g of a double salt of neodymium methacrylate/neodymium n-octylate and 2 g of propylene glycol to obtain a uniform solution. The solution was subjected to cast polymerization by the same procedure as that described in Example 4. The sheet thus obtained was transparent.

EXAMPLE 19

To 95 g of methyl methacrylate were added 3.0 g of trisacetylacetonatoneodymium and 2 g of propylene glycol to obtain a uniform solution. The solution was subjected to cast polymerization by the same procedure as that described in Example 4. The sheet thus obtained was transparent.

I claim:

1. A process for the preparation of selective light absorptive methacrylic resins, which comprises dispersing or dissolving a neodymium compound in a resin-forming starting material selected from the group consisting of monomeric methyl methacrylate, or a monomer mixture composed substantially of methyl methacrylate and partially polymerized products thereof, followed by polymerizing the resin-forming starting material.

2. A process for the preparation of selective light absorptive methacrylic resins according to claim 1, wherein the neodymium compound is selected from the group consisting of inorganic neodymium compounds, neodymium salts of inorganic acids, neodymium salts of organic acids, complex compounds containing neodymium and neodymium-containing double salts of inorganic or organic acids or a mixture thereof.

3. A process for the preparation of selective light absorptive methacrylic resins according to claim 1, wherein the neodymium compound is selected from the group consisting of neodymium nitrate, neodymium acetate, neodymium methacrylate, neodymium acrylate, neodymium methacrylate octylate and trisacetylacetonatoneodymium.

4. A process for the preparation of selective light absorptive methacrylic resins according to claim 1, wherein the neodymium compound is neodymium oxide.

5. A process for the preparation of selective light absorptive methacrylic resins according to claim 1, wherein the neodymium compound has an average particle size of 0.2 to 20 μm.

6. A process for the preparation of selective light absorptive methacrylic resins according to claim 1, wherein the amount of the neodymium compound dispersed is 0.1 to 5.0% by weight expressed in terms of neodymium and based on the weight of the resin-forming starting material.

7. A process for the preparation of selective light absorptive methacrylic resins according to claim 1, wherein a light diffusing agent is incorporated in the resin-forming starting material.

8. A process for the preparation of selective light absorptive methacrylic resins according to claim 7, wherein the light diffusing agent is selected from the group consisting of inorganic particles of calcium carbonate, barium sulfate, silica or aluminum hydroxide or particles of a plastic resin having a refractive index different from that of the base resin formed solely from the resin-forming starting material.

9. A process for the preparation of selective light absorptive methacrylic resins according to claim 1, wherein the resin-forming starting material is polymerized according to a cast polymerization procedure.

10. A process for the preparation of selective light absorptive methacrylic resins, which comprises a polymerizing a mixture comprising (a) a resin-forming starting material selected from the group consisting of monomeric methyl methacrylate, a monomer mixture composed mainly of methyl methacrylate and partially polymerized products thereof, (b) a neodymium compound and (c) a solvent capable of dissolving therein the resin-forming starting material and the neodymium compound.

11. A process for the preparation of selective light absorptive methacrylic resins according to claim 10, wherein the neodymium compound is selected from the group consisting of neodymium salts of inorganic acids and organic acids, complex compounds containing neodymium and neodymium-containing double salts of inorganic or organic salts or a mixture thereof.

12. A process for the preparation of selective light absorptive methacrylic resins according to claim 10, wherein the neodymium compound is selected from the group consisting of neodymium nitrate, neodymium acetate, neodymium acrylate, neodymium methacrylate, neodymium methacrylate octylate and trisacetylacetonatoneodymium.

13. A process for the preparation of selective light absorptive methacrylic resins according to claim 10, wherein the neodymium compound is neodymium oxide.

14. A process for the preparation of selective light absorptive methacrylic resins according to claim 10, wherein the amount of the neodymium compound is 0.1 to 5.0% by weight expressed in terms of neodymium and based on the weight of the resin-forming starting material.

15. A process for the preparation of selective light absorptive methacrylic resins according to claim 10, wherein the solvent capable of dissolving therein the resin-forming starting material and the neodymium compound is at least one member selected from the group consisting of compounds represented by the following general formulae:

wherein $R_1$ is a saturated or unsaturated hydrocarbon residue having 1 to 20 carbon atoms;

wherein $R_2$ is a hydrogen atom or a saturated or unsaturated hydrocarbon residue having 1 to 9 carbon atoms and $R_3$ is a saturated or unsaturated hydrocarbon residue having 1 to 4 carbon atoms;

wherein $R_4$ is a hydrogen atom or a methyl group, $A_1$ is an alkylene group having 2 to 6 carbon atoms and n is 0 or an integer of from 1 to 10;

wherein $R_5$ is a hydrogen atom or a methyl group and $R_6$ is an alkylene group having 2 to 6 carbon atoms;

wherein $R_7$ is a saturated or unsaturated hydrocarbon residue having 3 to 10 carbon atoms; and

wherein $R_8$ is a hydroxyl group or a saturated or unsaturated hydrocarbon residue having 1 to 10 carbon atoms, $A_2$ is an alkylene group having 2 to 4 carbon atoms and m is an integer of from 2 to 10.

16. A process for the preparation of selective light absorptive methacrylic resins according to claim 10, wherein the solvent is selected from the group consisting of unsaturated carboxylic acids, saturated and unsaturated fatty acids, hydroxyl group-containing esters, unsaturated alcohols, saturated alcohols and glycols.

17. A process for the preparation of selective light absorptive methacrylic resins according to cliam 10, wherein the solvent is selected from the group consisting of methacrylic acid, acrylic acid, octylic acid, 2-hydroxyethyl methacrylate and 2-hydroxyethyl acrylate.

18. A process for the preparation of selective light absorptive methacrylic resins according to claim 10, wherein the amount of the solvent is 0.1 to 40% by weight based on the weight of the total composition.

* * * * *